US008266698B1

(12) United States Patent
Seshardi et al.

(10) Patent No.: US 8,266,698 B1
(45) Date of Patent: Sep. 11, 2012

(54) USING MACHINE INFECTION CHARACTERISTICS FOR BEHAVIOR-BASED DETECTION OF MALWARE

(75) Inventors: Vijay Seshardi, Milpitas, CA (US); Zulfikar Ramzan, Cupertino, CA (US); Sourabh Satish, Fremont, CA (US); Chandrasekhar Kalle, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 480 days.

(21) Appl. No.: 12/400,699

(22) Filed: Mar. 9, 2009

(51) Int. Cl.
*G06F 21/00* (2006.01)
(52) U.S. Cl. .................. 726/24; 726/22; 726/25
(58) Field of Classification Search .................. None
See application file for complete search history.

(56) References Cited

U.S. PATENT DOCUMENTS

| 8,028,338 B1* | 9/2011 | Schneider et al. ............ 726/24 |
| 8,161,548 B1* | 4/2012 | Wan ................ 726/22 |
| 2007/0180528 A1* | 8/2007 | Kane ............... 726/24 |
| 2007/0240217 A1* | 10/2007 | Tuvell et al. ............ 726/24 |
| 2008/0127336 A1* | 5/2008 | Sun et al. ............ 726/22 |
| 2008/0301796 A1* | 12/2008 | Holostov et al. ............ 726/12 |
| 2009/0049549 A1* | 2/2009 | Park et al. ............ 726/22 |
| 2010/0077481 A1* | 3/2010 | Polyakov et al. ............ 726/24 |

OTHER PUBLICATIONS

Mu, et al. "Signature Generation and Detection of Malware Families," ACISP 2008, Springer-Verlag Berlin Heidelberg, LNCS 5107, pp. 336-349.*
Bailey, M. et al., "Automated Classification and Analysis of Internet Malware," Kruegel, C. et al. (Eds.), RAID 2007, LNCS 4637, 2007, pp. 178-197, Springer-Verlag, Berlin, Heidelberg, Germany.
Preda, M.D. et al., "A Semantics-Based Approach to Malware Detection," Proceedings of the 34th ACM SIGPLAN-SIGACT Symposium on Principles of Programming Languages (POPL 2007), Jan. 17-19, 2007, pp. 1-12, Nice France.

* cited by examiner

*Primary Examiner* — Jung Kim
*Assistant Examiner* — Robert Leung
(74) *Attorney, Agent, or Firm* — Fenwick & West LLP

(57) ABSTRACT

One or more behavior-based features describing an execution of an application on a client are generated. One or more client-specific features are generated, wherein the client-specific features describe aspects of the client. A malware score is generated based on the behavior-based features and the client-specific features. Whether the application is a malware threat is determined based on the malware score and a result of the determination is stored.

15 Claims, 7 Drawing Sheets

USING MACHINE INFECTION CHARACTERISTICS FOR BEHAVIOR-BASED DETECTION OF MALWARE

BACKGROUND OF THE INVENTION

1. Field of the Invention

This invention pertains in general to computer security and in particular to the identification of malicious software (malware).

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

Security software commonly functions to identify malware threats based on signatures that define information that is unique to known malware threats. Typically, a security software provider transmits a set of signatures to a client running the provider's software. The signatures are then used by the provider's security software to scan the client system for files with information matching the signatures.

Signature-based methods of malware threat identification are complicated by the large number of new malware threats or variations of existing malware threats (i.e. polymorphic malware) that are continuously being disseminated into computing environments. The continuous development and introduction of new malware threats into computing environments makes the generation of a comprehensive set of malware signatures corresponding to malware threats difficult. Also, the corresponding set of malware signatures that must be created in association with the large number of malware threats can range from thousands to millions of signatures, creating further difficulties associated with the efficiency and scalability of transmitting the set of malware signatures to the clients and using the set of malware signatures to scan the clients.

Due to the problems associated with signature-based approaches for malware identification, alternate approaches such as behavior-based identification of malware threats have been developed. Behavior-based identification of malware seeks to identify malware threats by monitoring behaviors or actions performed by software applications as they execute on a client system. In behavior-based identification of malware threats, software applications that perform one or more behaviors or actions that are associated with a high likelihood of being performed by a malware threat may be identified as malware threats.

Although behavior-based identification of malware provides a beneficial alternative to signature-based identification of malware, it is difficult to assess whether an application is a malware threat based only on behaviors or actions that have a high likelihood of being performed by malware threats. Specifically, it is difficult to assess whether behaviors that have a high likelihood of being performed by malware may sometimes be performed by applications that are not malware threats. Consequently, there is a high likelihood of generating false positive identifications of malware using behavior-based methods of malware identification. Accordingly, there is a need in the art for improved methods of identifying malware threats.

BRIEF SUMMARY

The above and other needs are met by methods, systems, and computer-readable storage media for identifying malware threats.

One aspect provides a computer-implemented method of determining whether an application is a malware threat. One or more behavior-based features describing an execution of an application on a client are generated. One or more client-specific features are generated, wherein the client-specific features describe aspects of the client. A malware score is generated based on the behavior-based features and the client-specific features. Whether the application is a malware threat is determined based on the malware score and a result of the determination is stored.

Another aspect provides a computer system for generating a malware classifier. The computer system comprises a processor and a memory. The computer system further comprises a classifier generation module stored in the memory and executable by the processor to identify a plurality of feature vectors associated with a plurality of applications, each feature vector comprising a set of features describing behaviors of an application executed on a client and a set of features describing aspects of the client on which the application is executed and each feature vector having associated information identifying an application with which the feature vector is associated. The classifier generation module is further executable to identify a subset of the plurality of applications as known goodware applications and a subset of the plurality of applications as malware threats. The classifier generation module is further executable to generate a malware classifier based on the feature vectors associated with the subset of applications that are known goodware applications and the subset of applications that are known malware threats and store the malware classifier.

Another aspect provides a computer-readable storage medium encoded with executable computer program code for determining whether an application is a malware threat according to the method described above.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
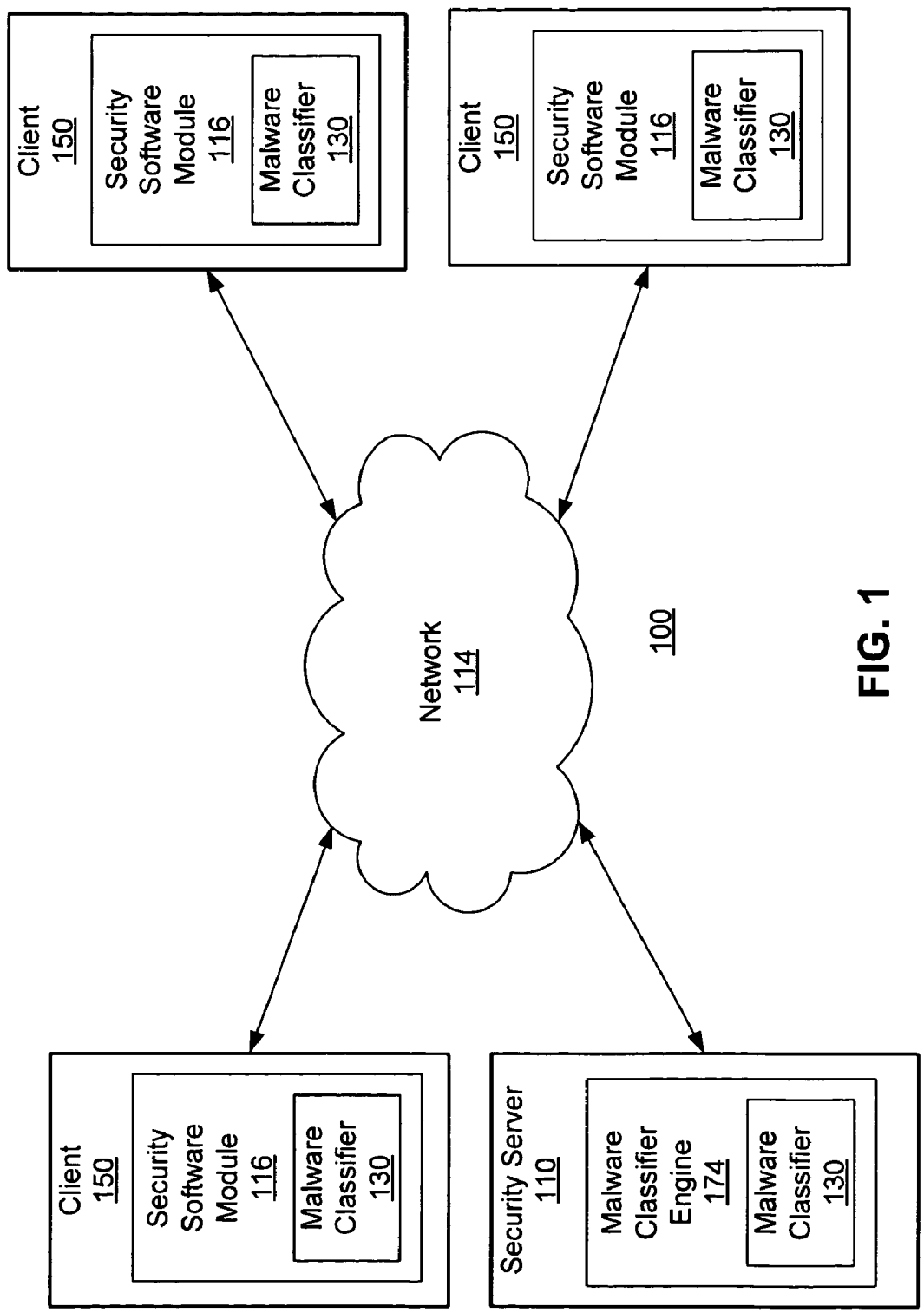
FIG. 1 is a high-level block diagram of a computing environment 100 according to one embodiment.

FIG. 1 is a high-level block diagram of a computing environment 100 according to one embodiment. FIG. 1 illustrates a security server 110 and plurality of clients 150 connected by a network 114. Only three clients 150 are shown in FIG. 1 in order to simplify and clarify the description. Embodiments of the computing environment 100 can have thousands or millions of clients 150 connected to the network 114.

The security server 110 interacts with the clients 150 via the network 114. The security server 110 comprises a malware classifier engine 174 which generates a malware classifier 130. A classifier is a statistical model which specifies a method by which characteristics, herein referred to as "features", associated with an event can be used to determine whether the event belongs to a class or group of events. An event, as referred to herein, can be an instance of an entity such as a malware threat or an instance of an action such as an identification of a malware threat. Classifiers are generated or "trained" based on sets of features associated with events that are known to belong to a class of events using machine learning algorithms which seek to identify subsets of the features which can be used to distinguish the class of events from other classes of events. The "discriminative power" of a feature describes the feature's relative utility in distinguishing a class of events from other classes of events.

A malware classifier is a statistical model which specifies a set of features or characteristics associated with a software application. The security server 110 generates a malware classifier 130 based on features associated with instances of software applications executing on clients 150. Accordingly, the malware classifier 130 generated by the security server 110 seeks to model sets of features associated with the execution of a software application which distinguish known malware threats from innocuous applications.

The features associated with the instances of a software application executing on a client 150 include both "behavior-based features" which describe a set of behaviors or actions that the software application performs while executing on the client 150 and "client-specific features" which represent aspects of the client 150 that the software application is executing on. Aspects of the client 150 represented by the client-specific features may include the infection history of the client 150 and/or the security settings associated with other software applications on the client 150.

The security server 110 receives the sets of features associated from the software applications from the clients 150. The security server 110 determines whether the software applications correspond to known malware threats and/or known innocuous or "goodware" applications based on information which uniquely identifies the software application. The security server 110 generates the malware classifier 130 based on the sets of features associated with the known malware threats and known goodware applications. The security server 110 transmits the malware classifier 130 to the clients 150.

Each of the clients 150 executes a security software module 116 which uses the received malware classifier 130 to determine whether suspicious software applications correspond to malware threats. The security software module 116 monitors the behaviors and actions associated with the suspicious software applications. The security software module 116 generates sets of features or "feature vectors" which include features which describe behaviors or actions associated with the execution of the suspicious software applications (behavior-based features) and features which represent aspects of the client 150 (client-specific features). The malware security module 116 applies the malware classifier 130 to the feature vectors in order to generate malware scores that indicate the likelihood that the suspicious software applications are malware. Based on the malware scores, the malware security module 116 can determine whether the suspicious software applications correspond to malware threats.

In one embodiment, a client 150 is a computer used by one or more users to perform activities including downloading, installing, and/or executing software entities. The client 150, for example, can be a personal computer executing a web browser such as MICROSOFT INTERNET EXPLORER that allows the user to retrieve and display content from websites and other computers on the network 114. In other embodiments, the client 150 is a network-capable device other than a computer, such as a personal digital assistant (PDA), a mobile telephone, a pager, a television "set-top box," etc. For purposes of this description, the term "client" also includes computers such as servers and gateways that encounter software entities or other entities that might constitute malware or other threats. For example, a client 150 can be a network gateway located between an enterprise network and the Internet.

Using client-specific features in addition to behavior-based features in order to generate a malware classifier 130 is beneficial because these features can represent "hidden dependencies" between aspects of the client 150 and the behaviors and actions of an application executing on the client 15. A hidden dependency between two features refers to an instance where a characteristic represented by one of the features has an effect or impact on a characteristic represented by another feature. These hidden dependencies result in combinations of client-specific features and behavior-based features which have significantly different discriminative power in distinguishing malware threats from goodware applications when combined than when used separately.

For instance, aspects of the client 150 such as security settings of software applications on the client 150 may indirectly or directly affect the behaviors or actions that applications which are executed on the client 150 are able to perform. Therefore, a behavior-based feature describing that an application does not perform an action associated with malware may have reduced discriminative power if observed in association with a client-specific feature representing a security setting of software on the client 150 which prohibits execution of the action. Also, aspects of the client 150 such as infection history may modulate the likelihood that a behavior is performed by malware. For instance, a behavior-based feature describing an action that is sometimes performed by malware threats may have a higher discriminative power if observed in conjunction with a client-specific feature describing a high rate of infection.

By including both client-specific features and behavior-based features, the malware classifier 130 can statistically model the hidden dependencies between the features, thus influencing the ability to distinguish malware threats from innocuous applications. Accordingly, the malware classifier 130 may specify unique combinations of client-specific features and behavior-based features which have a higher discriminative power in distinguishing malware threats from goodware applications, thus reducing the rate of false negative identifications of malware threats. Likewise, the ability to model hidden dependencies allows the malware classifier 130 to reduce the rate of false positive identifications of malware threats by hidden dependencies which cause one or more features to have reduced discriminative power.

The network 114 represents the communication pathways between the security server 110 and clients 150. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
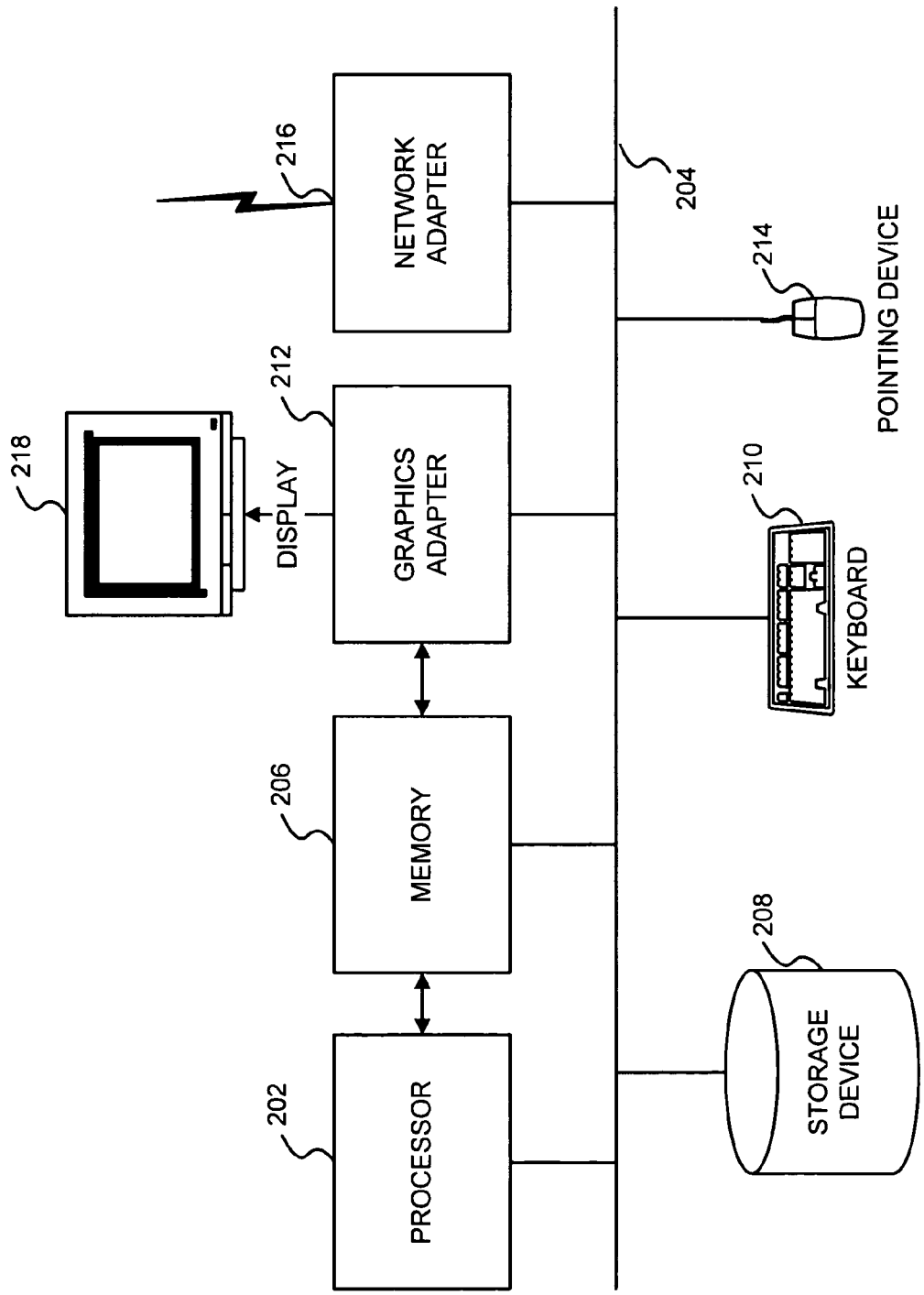
FIG. 2 is a high-level block diagram illustrating a typical computer 200 for use as a security server 110 or a client 150 according to one embodiment.

FIG. 2 is a high-level block diagram illustrating a typical computer 200 for use as a security server 110 or a client 150 according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 150 that is a mobile telephone typically has limited processing power, a small display 218, and might lack a pointing device 214. The security server 110, in contrast, may comprise multiple blade servers working together to provide the functionality described herein.

Figure 3:
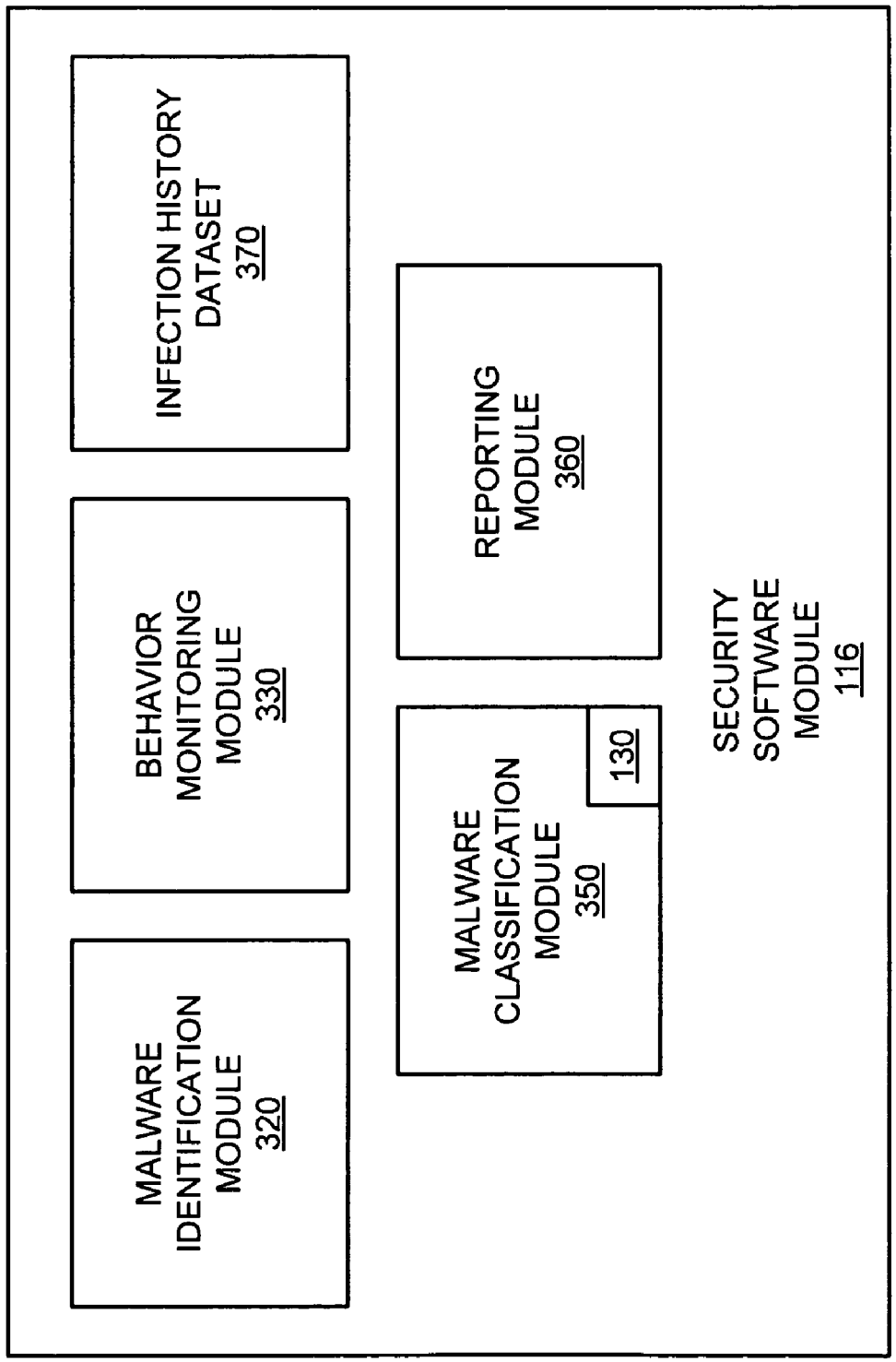
FIG. 3 is a high-level block diagram illustrating a detailed view of the security software module 116 according to one embodiment.

FIG. 3 is a high-level block diagram illustrating a detailed view of the malware security module 116 according to one embodiment. As shown in FIG. 3, the malware security module 116 includes several modules. Those of skill in the art will recognize that other embodiments can have different and/or other modules than the ones described here, and that the functionalities can be distributed among the modules in a different manner. In addition, the functions ascribed to the malware security module 116 can be performed by multiple servers.

A malware identification module 320 identifies suspicious software applications on the client 150. In one embodiment, the malware identification module 320 identifies all software applications that the malware identification module 320 has not been previously identified and determined not to correspond to malware threats as suspicious software applications. The malware identification module 320 scans the memory and storage devices associated with the client 150 to identify suspicious software applications. The malware identification module 320 may continuously scan the memory 206 and storage devices 208 associated with the client 150 or scan the memory and storage devices associated with the client 150 periodically according to a pre-defined schedule. In some embodiments, the malware identification module 320 identifies a suspicious software application responsive to a notification that a user of the client 150 has downloaded a software application.

The malware identification module 320 may also communicate with the behavior monitoring module 330 in order to identify suspicious software applications based on behaviors performed by the software applications such as communications performed by the suspicious software applications or modifications to data on the client 150 performed by the suspicious software applications.

Upon identification of a suspicious software application, the malware identification module 320 communicates with the behavior monitoring module 330, the infection history dataset 370 and the malware classification module 350 to generate a malware score for the suspicious software application based on client-specific features associated with the client 150 and behavior-based features associated with the suspicious software application. The malware score indicates the likelihood that the suspicious software application is a malware threat. According to the embodiment and the type of malware classifier 130 used, the malware score may be a binary score indicating whether or not the suspicious software application is a malware threat. In another embodiment, the malware score may be continuous score indicating a probability that a software application is a known malware threat or a percentage similarity to known malware threats.

If the malware score indicates a high likelihood that the suspicious software application is malware, the malware identification module 320 determines that the suspicious software application is a malware threat and "convicts" the suspicious software application. Upon convicting a suspicious software application, the malware identification module 320 generates and reports information describing the conviction of the suspicious software application (i.e. "the malware detection event") to the security server 110 via the reporting module 360.

In some embodiments, the malware identification module 320 transmits information which uniquely identifies the convicted software application to the security server 110 in association with the information describing the malware detection event. Information uniquely identifying the convicted software application can include a fingerprint or hash associated with the convicted software applications and the feature vector used by the malware classification module 360 to generate the malware score associated with the convicted software application. In these embodiments, the malware identification module 320 may receive additional information associated with the convicted software application from the security server 110 such as information indicating the severity of the convicted software application or information indicating the family of malware threats the convicted software application is part of.

The malware identification module 320 further remediates the client 150 responsive to the malware detection event, for example, by removing the convicted software application. In some embodiments, the malware identification module 320 may remediate the client by examining the files and software applications associated with the client 150 to identify and remove malicious code inserted by the convicted software application. In some embodiments, the malware identification module 320 may determine a degree of performance degradation associated with the malware detection event by monitoring system performance before and after removing the convicted software application.

The malware identification module 320 stores the record of the malware detection event and associated information describing the malware detection event in the infection history dataset 370. The record of the malware detection event can include: the severity of the convicted software application associated with the malware detection event, the time/date at which the convicted software application was downloaded to the client 150, the time/date associated with the malware detection event, the type of convicted software application associated with malware infection event, a family of the convicted software application associated with the malware detection event, security settings associated with applications on the client 150 at the time of the malware detection event and performance degradation associated with the malware detection event.

The behavior monitoring module 330 functions to monitor the behaviors and actions performed by suspicious software applications. The behavior monitoring module 330 monitors communications with other entities performed by the suspicious software applications, modifications to files or other software applications performed by the suspicious software applications, modifications to the memory 206 or storage device 208 associated with the client 150 performed by the suspicious software applications and commands and/or actions performed by the suspicious software applications. In some embodiments, the behavior monitoring module 330 may quarantine the suspicious software applications in a secure or "sandbox" environment before executing the software applications to monitor behaviors and actions performed by the suspicious software applications.

The malware classification module 350 generates malware scores for suspicious software applications by applying a malware classifier 130 to client-specific features and behavior-based features associated with suspicious software applications. The malware classification module 350 communicates with the reporting module 360 to receive and store the malware classifier 130.

The malware classification module 350 communicates with the behavior monitoring module 330 to identify a set of behaviors and actions performed by a suspicious software application. The malware classification module 350 generates a set of behavior-based features which represent the set of behaviors and actions performed by the suspicious software application. The malware classification module 350 further generates a set of client-specific features based on malware detection event records stored in the infection history dataset 370. Accordingly, the malware classification module 350 generates a client-specific dataset which represents to the aspects of the client 150 at the time at which the set of behaviors and actions were performed on the client 150.

The client-specific features generated by the malware classification module 350 may include: an overall frequency of malware detection events on the client 150, a frequency of malware detection events on the client 150 associated with a specific time period (e.g. within the last 2 months), a severity of the convicted software applications associated with the malware detection events on the client 150, performance degradations associated with the malware detection events on the client 150 and security settings associated with the programs on the client 150 at the time of the malware detection events.

The malware classification module 350 combines the client-specific features and the behavior-based features associated with the software application to generate a feature vector for the suspicious software application. In some embodiments, the malware classification module 350 generates information which uniquely identifies the suspicious software application and transmits the feature vectors in association with the information which uniquely identifies the suspicious software application to the security server 110 via the reporting module 360.

The malware classification module 350 further applies the malware classifier 130 to the feature vector associated with the suspicious software application to generate a malware score for the suspicious software application. The malware classification module 350 transmits the generated malware score to the malware identification module 320.

The reporting module 360 communicates with the security server 110 to receive malware classifiers 130 and information associated with convicted software applications. The reporting module 360 may receive newly generated malware classifiers 130 periodically or according to a defined schedule. The reporting module 360 transmits the newly received malware classifiers 130 to the malware identification module 320. The reporting module 360 further transmits information to the security server 110 including feature vectors associated with suspicious software applications, information associated with malware detection events and information which uniquely identifies suspicious and/or convicted software applications.

Figure 4:
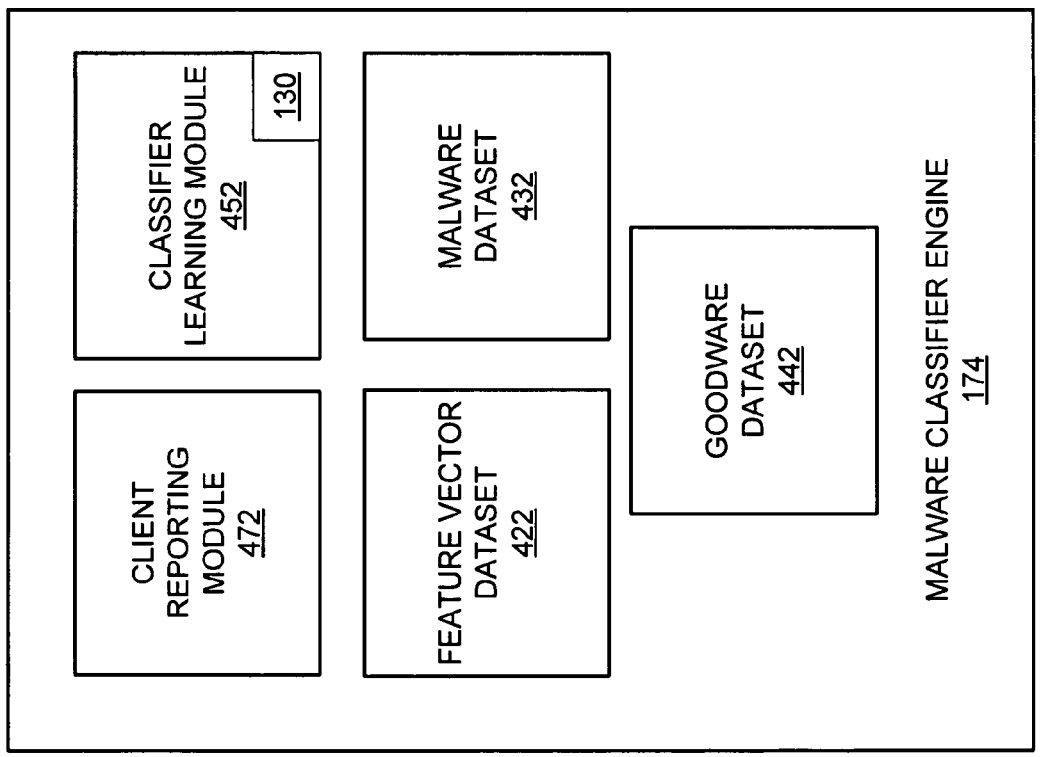
FIG. 4 is a high-level block diagram illustrating a detailed view of the malware classifier engine 174 according to one embodiment.

FIG. 4 is a high-level block diagram illustrating a detailed view of the malware classifier engine 174 according to one embodiment. As shown in FIG. 4, the malware classifier engine 174 includes multiple modules. Those of skill in the art will recognize that other embodiments of the malware classifier engine 174 can have different and/or other modules than the ones described here, and that the functionalities can be distributed among the modules in a different manner.

The client reporting module 472 communicates with the malware security modules 116 on the clients 150. The client reporting module 472 receives feature vectors, each feature vector comprising behavior-based features associated with a suspicious software application and client-specific features associated with the client 150 the suspicious software application is executing on. The client reporting module 472 stores the feature vectors in association with the information uniquely identifying the suspicious software application in the feature vector dataset 422.

The client reporting module 472 further transmits information to the malware security modules on the clients 150. The client reporting module 472 communicates with the classifier learning module 452 to transmit malware classifiers 130 to the malware security modules on the clients 150.

In some embodiments, the client reporting module 472 may further retrieve and transmit information included in the malware dataset 432 responsive to receiving information indicating a convicted software application associated with a malware detection event. In these embodiments, the client reporting module 472 receives information uniquely identifying a convicted software application associated with a malware threat event from a software security module 116 on a client 150. The client reporting module 472 determines whether information corresponding to the convicted software application is stored in the malware dataset 432. If the client reporting module 472 determines that information corresponding to the convicted software application is stored in the malware dataset 432, the client reporting module 472 transmits the information corresponding to the convicted software application to the software security module 116 on the client 150.

The malware dataset 432 stores information describing known malware threats such as the severity of the malware threat, the family of the malware threat and parties associated with the malware threat in association with information used to uniquely identify the malware threats (e.g. hashes, fingerprints and/or other data unique to the malware threat). The goodware dataset 442 stores information describing known goodware applications (i.e. innocuous applications known not to contain malware) in association with information used to uniquely identify the goodware applications.

According to the embodiment, the information contained in the malware dataset 432 and the goodware dataset 442 may be provided by different sources. The malware dataset 432 and the goodware dataset 442 may be compiled, for example, by an administrator of the malware classifier engine 174. In some embodiments, some or all of the information in the malware dataset 432 and the goodware dataset 442 may be compiled by a security software provider.

The classifier learning module 452 generates the malware classifier 130 based on the feature vector dataset 422, the malware dataset 432 and the goodware dataset 442. The classifier learning module 452 determines whether suspicious software applications associated with feature vectors in the feature vector dataset 422 correspond to known malware threats or goodware applications based on information uniquely identifying the suspicious software applications stored in the malware dataset 432 and the goodware dataset 442. The classifier learning module 452 determines whether the information uniquely identifying the suspicious software applications corresponds to the information uniquely identifying the known goodware applications or malware threats. If the information uniquely identifying a suspicious software application corresponds to the information uniquely identifying a known goodware application or malware threat, the classifier learning module 452 adds one or more feature vectors associated with the suspicious software applications to a malware training set or a goodware training set, respectively. The malware training set is a collection of feature vectors associated with known malware threats. The goodware training set is a collection of vectors associated with known goodware applications.

The classifier learning module 452 applies a machine learning algorithm to the malware training set and the goodware training set in order to generate the malware classifier 130. According to the embodiment, the classifier learning module 452 may use any type of machine learning algorithm such as Bayesian machine learning algorithms, decision tree algorithms, logistic regression algorithms, support vector machine algorithms or expectation maximization algorithms. Other machine learning algorithms are well known to those skilled in the art.

The classifier learning module 452 iteratively re-generates new malware classifiers 130 as additional feature vectors corresponding to known goodware and malware applications are received by the client reporting module 472 and added to the feature vector dataset 422. The classifier learning module 452 may re-generate the malware classifier 130 based on the number of additional feature vectors added to the feature vector dataset 422 or according to a pre-defined schedule. For example, the classifier learning module 452 may re-generate the malware classifier 130 once an hour, day, week or month. The classifier leaning module 452 communicates with the client reporting module 472 to transmit the newly generated malware classifiers 130 to the clients 150.

Figure 5:
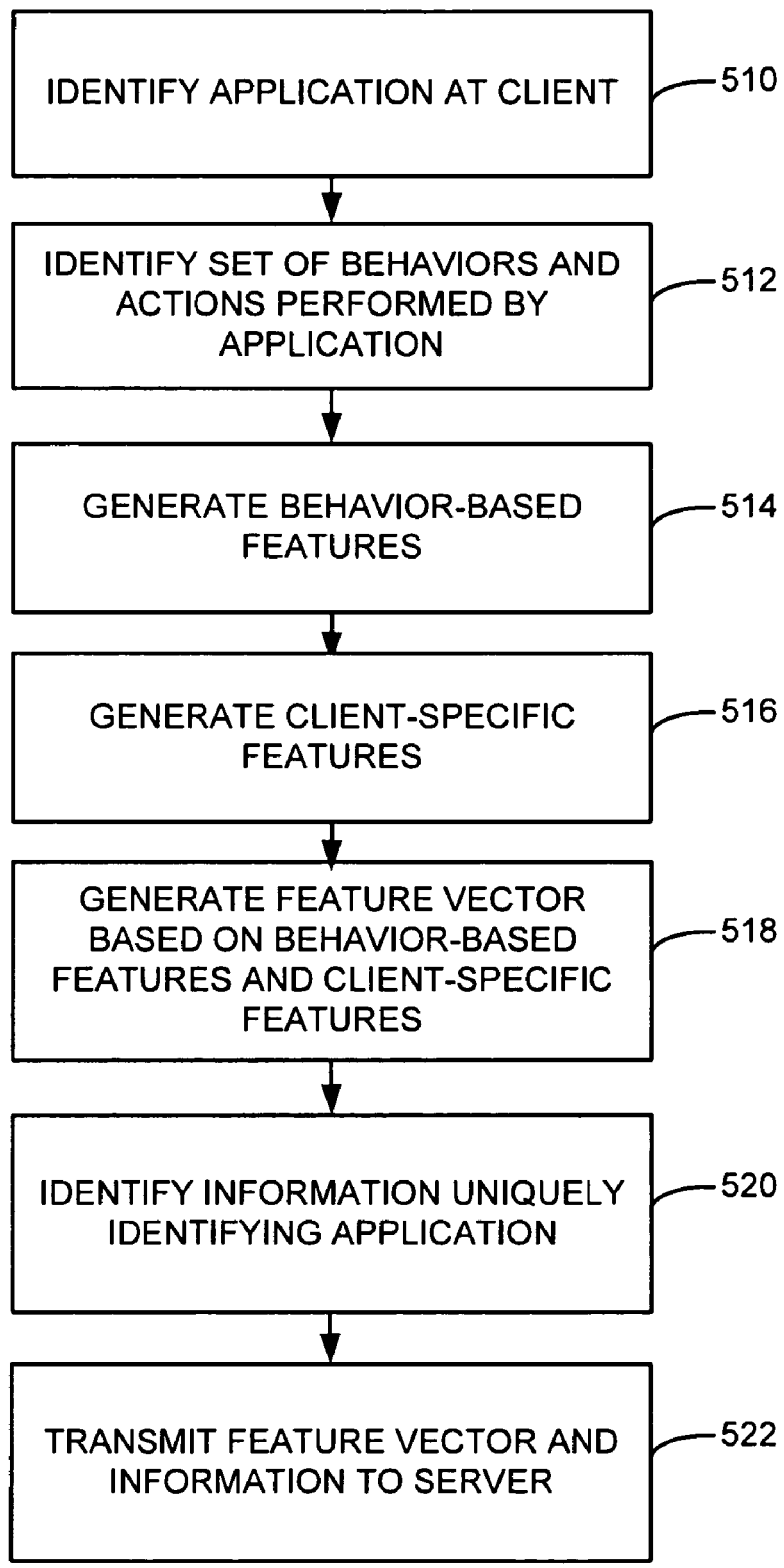
FIG. 5 is a flowchart illustrating steps performed by the security software module 116 to transmit a feature vector associated with a suspicious software application to the security server 110 according to one embodiment.

FIG. 5 is a flowchart illustrating steps performed by the security software module 116 to transmit feature vectors to the malware classifier engine 174 according to one embodiment. Other embodiments perform the illustrated steps in different orders, and/or perform different or additional steps. Moreover, some of the steps can be performed by engines or modules other than the security software module 116.

The security software module 116 identifies 510 a suspicious software application at the client 150. The security software module 116 identifies 512 a set of behaviors and actions performed by the suspicious software application by monitoring the suspicious software application at the client 150. The security software module 116 also generates 514 a set of behavior-based features which describe the set of behaviors and actions. The security software module 116 generates 516 a set of client-specific features which represent aspects of the client 150 based on a set of records describing malware detection events stored in the infection history dataset 370. The security software module 116 combines the client-specific features and the behavior-based features to generate 518 a feature vector for the suspicious software application. The security software module 116 identifies 520 information that uniquely identifies the suspicious software application. The security software module 116 transmits 522 the feature vector for the suspicious software application in association with the information that uniquely identifies the software application to the malware classifier engine 174.

Figure 6:
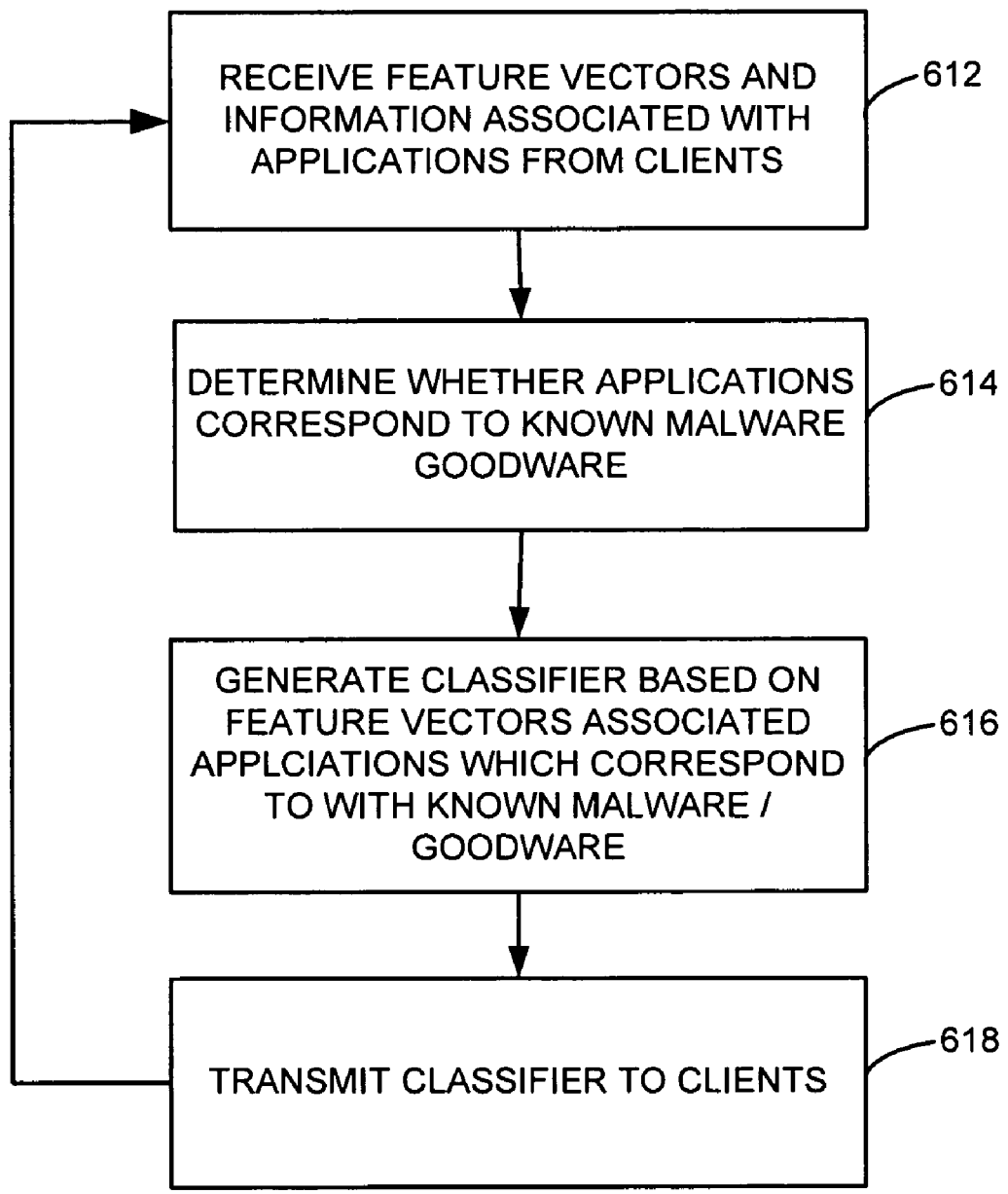
FIG. 6 is a flowchart illustrating steps performed by the malware classifier engine 174 to iteratively generate a malware classifier 130 according to one embodiment.

FIG. 6 is a flowchart illustrating steps performed by the malware classifier engine 174 to iteratively generate malware classifiers 130 according to one embodiment. Other embodiments perform the illustrated steps in different orders, and/or perform different or additional steps. Moreover, some of the steps can be performed by engines or modules other than the malware classifier engine 174.

The malware classifier engine 174 receives 612 feature vectors associated with suspicious software applications in association with information that uniquely identifies the suspicious software applications from the clients 150. The malware classifier engine 174 compares the information that uniquely identifies the suspicious software applications to information stored in the malware dataset 432 and the goodware dataset 442 that, respectively, uniquely identifies known malware threats and known goodware applications to determine 614 whether the software applications correspond to known malware threats and known goodware applications. The malware classifier engine 174 generates 616 a malware classifier 130 based on a malware training set comprised of feature vectors associated with suspicious software applications that correspond to known malware threats and a goodware training set comprised of feature vectors associated with suspicious software applications that correspond to known goodware applications. The malware classifier engine 174 transmits 618 the malware classifier 130 to the clients 130. The malware classifier engine 174 iteratively repeats the steps of receiving 612 the feature vectors, determining 614 whether the feature vectors correspond to known malware threats or goodware applications, generating 616 the malware classifier 130 and transmitting 618 the newly generated malware classifiers 130 to the clients 150.

Figure 7:
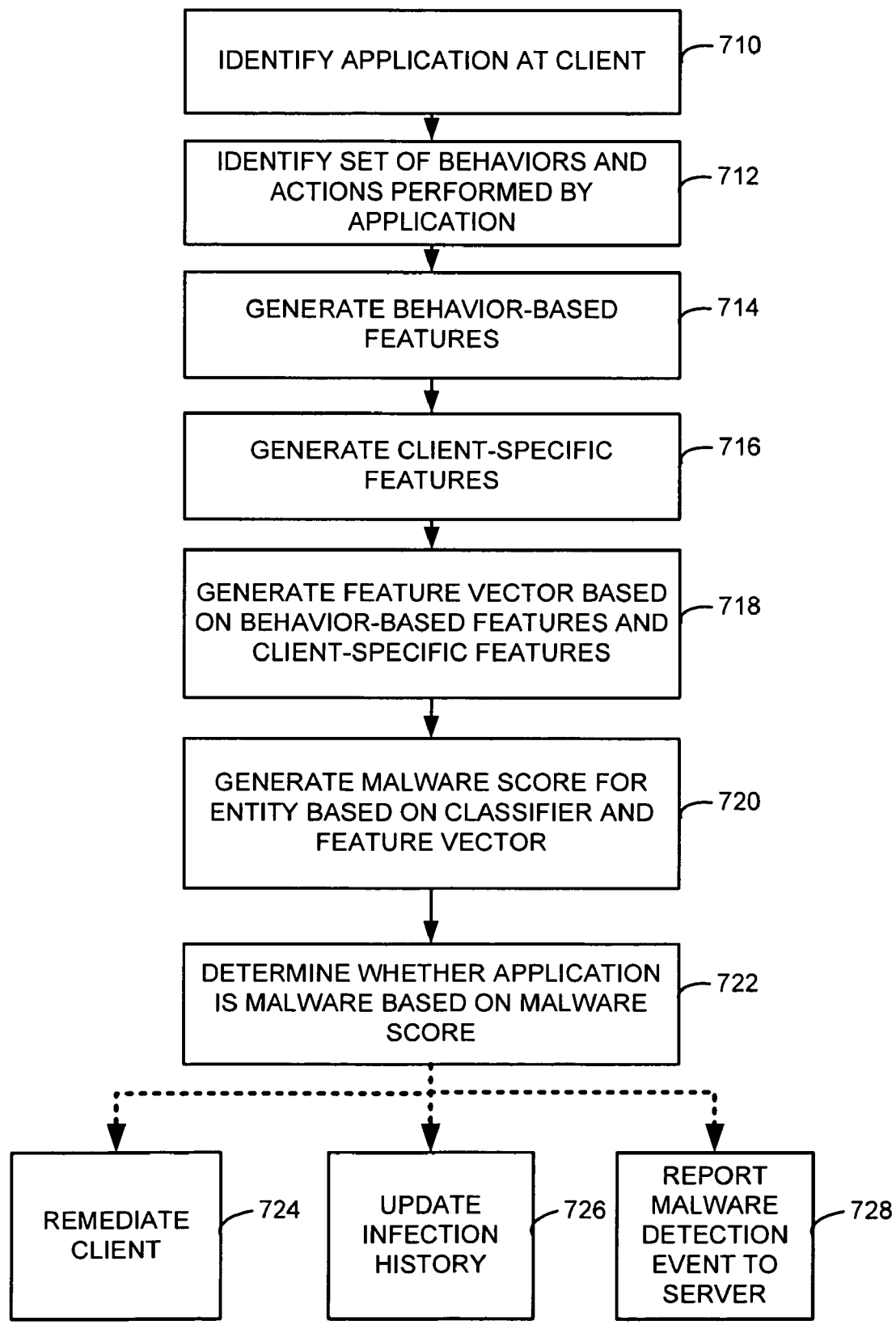
FIG. 7 is a flowchart illustrating steps performed by the security software module 116 to determine whether an application is a malware threat according to one embodiment.

FIG. 7 is a flowchart illustrating steps performed by the security software module 116 to determine whether suspicious software applications are malware threats according to one embodiment. Other embodiments perform the illustrated steps in different orders, and/or perform different or additional steps. Moreover, some of the steps can be performed by engines or modules other than the security software module 116.

The security software module 116 identifies 710 a suspicious software application at the client 150. The security software module 116 identifies 712 a set of behaviors and actions performed by the suspicious software application by monitoring the suspicious software application at the client 150. The security software module 116 generates 714 a set of behavior-based features which represent the set of behaviors and actions. The security software module 116 generates 716 a set of client-specific features based on a set of malware detection event records stored in the infection history dataset 370. The security software module 116 combines the client-specific features and the behavior-based features to generate 718 a feature vector for the suspicious software application. The security software module 116 generates 720 a malware score for the suspicious software application by applying a malware classifier 130 to the feature vector associated with the suspicious software application. The security software module 116 determines 722 whether the suspicious software application is a malware threat. If is the suspicious software application is determined to be a malware threat based on the malware score, the security software module 116 remediates 724 the client 150, updates 726 the infection history dataset 370 to include a record describing the malware detection event and reports 728 the malware detection event record to the malware classification engine 174.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining whether an application is a malware threat, the method executed by one or more computer systems and comprising:
    generating one or more behavior-based features describing an execution of an application on a client;
    generating one or more client-specific features describing aspects of the client;
    combining the client-specific features and the behavior-based features to generate a combined feature vector;
    receiving a malware classifier from a server, the server receiving a plurality of combined feature vectors associated with a plurality of applications from a plurality of clients and generating the malware classifier based at least in part on the plurality of combined feature vectors, the malware classifier statistically modeling hidden dependencies between the client-specific and the behavior-based features to distinguish between innocuous and malicious applications, the hidden dependencies including a characteristic represented by one of the features having an effect on a characteristic represented by another feature;
    generating a malware score responsive to applying the malware classifier to the combined feature vector;
    determining whether the application is a malware threat based on the malware score; and
    storing a result of the determination.

2. The method of claim 1, further comprising:
    transmitting the combined feature vector to the server.

3. The method of claim 1, wherein the client-specific features describe a malware infection history associated with the client.

4. The method of claim 3, wherein the malware infection history describes one or more of:
    a severity associated with one or more malware detection events identified on the client; and
    performance degradations associated with one or more malware detection events identified on the client.

5. The method of claim 1, further comprising:
    remediating the client responsive to determining that the application is a malware threat.

6. A computer system for generating a malware classifier, the system comprising:
    a processor;
    a memory;
    a classifier generation module stored in the memory and executable by the processor to:
        receive a plurality of combined feature vectors associated with a plurality of applications from a plurality of clients, each combined feature vector received from a client comprising a set of features describing behaviors of an application executed on the client and a set of features describing client-specific aspects of the client on which the application executed;
        identify a subset of the plurality of applications as known goodware applications and a subset of the plurality of applications as known malware threats;
        generate a malware classifier based on the combined feature vectors associated with the subset of applications that are known goodware applications and the subset of applications that are known malware threats, the malware classifier statistically modeling hidden dependencies between client-specific and behavior-based features to distinguish between the goodware applications and the known malware threats, the hidden dependencies including a characteristic represented by one of the features having an effect on a characteristic represented by another feature; and
        store the malware classifier.

7. The system of claim 6, further comprising a reporting module stored in the memory and executable by the processor to:
    receive information identifying the application of the plurality of applications with which each combined feature vector is associated.

8. The system of claim 7, wherein the information identifying the application of the plurality of applications comprises a hash derived from the application.

9. The system of claim 6, further comprising:
    a database comprising information identifying a set of known goodware applications and information identifying a set of known malware threats; and
    wherein the classifier generation module is further executable to:
        identify information identifying the plurality of applications;

identify a subset of the plurality of application as known goodware applications and a subset of the plurality of applications as known malware applications responsive to determining that the information identifying the plurality of applications corresponds, in part, to the information identifying the set of known goodware applications or the information identifying the set of known malware threats.

10. The system of claim 6, further comprising a reporting module stored in the memory and executable by the processor to:

transmit the malware classifier to the plurality of clients, wherein the plurality of clients are adapted to use the malware classifier to identify malware threats on the clients.

11. A non-transitory computer-readable storage medium encoded with executable computer program code for determining whether an application is a malware threat, the program code comprising program code for:

generating one or more behavior-based features describing an execution of an application on a client;

generating one or more client-specific features describing aspects of the client;

combining the client-specific features and the behavior-based features to generate a combined feature vector;

receiving a malware classifier from a server, the server receiving a plurality of combined feature vectors associated with a plurality of applications from a plurality of clients and generating the malware classifier based at least in part on the plurality of combined feature vectors, the malware classifier statistically modeling hidden dependencies between the client-specific and the behavior-based features to distinguish between innocuous and malicious applications, the hidden dependencies including a characteristic represented by one of the features having an effect on a characteristic represented by another feature;

generating a malware score responsive to applying the malware classifier to the combined feature vector;

determining whether the application is a malware threat based on the malware score; and storing a result of the determination.

12. The medium of claim 11, further comprising program code for:

transmitting the combined feature vector to the server.

13. The medium of claim 11, wherein the client-specific features describe a malware infection history associated with the client.

14. The medium of claim 13, wherein the malware infection history describes one or more of:

a severity associated with one or more malware detection events identified on the client; and performance degradations associated with one or more malware detection events identified on the client.

15. The medium of claim 11, further comprising program code for:

remediating the client responsive to determining that the application is a malware threat.

* * * * *

UNITED STATES PATENT AND TRADEMARK OFFICE
CERTIFICATE OF CORRECTION

PATENT NO.         : 8,266,698 B1
APPLICATION NO.    : 12/400699
DATED              : September 11, 2012
INVENTOR(S)        : Vijay Seshadri et al.

Page 1 of 1

It is certified that error appears in the above-identified patent and that said Letters Patent is hereby corrected as shown below:

Title Page, Item (12) "Seshardi et al." should read -- Seshadri et al. --

Title Page, Item (75) Inventors section, please delete "Vijay Seshardi" and insert -- Vijay Seshadri --.

Signed and Sealed this
Twelfth Day of February, 2013

Teresa Stanek Rea
*Acting Director of the United States Patent and Trademark Office*